United States Patent
Newton et al.

(10) Patent No.: US 11,204,041 B2
(45) Date of Patent: Dec. 21, 2021

(54) REDUNDANT DRIVE ORBITTALLY DRIVEN ELECTRIC DUCTED FAN PRODUCING TORQUE WITH LOWER ELECTRIC CURRENT DRAWN

(71) Applicants: Stephen T Newton, Shepherdsville, KY (US); Stephen T. Newton, II, Ingalls, IN (US)

(72) Inventors: Stephen T Newton, Shepherdsville, KY (US); Stephen T. Newton, II, Ingalls, IN (US)

( * ) Notice: Subject to any disclaimer, the term of this patent is extended or adjusted under 35 U.S.C. 154(b) by 147 days.

(21) Appl. No.: 16/593,672

(22) Filed: Oct. 4, 2019

(65) Prior Publication Data

US 2021/0102553 A1    Apr. 8, 2021

(51) Int. Cl.
| | | |
|---|---|---|
| *F04D 29/54* | (2006.01) | |
| *F04D 29/38* | (2006.01) | |
| *F04D 25/08* | (2006.01) | |
| *F04D 25/06* | (2006.01) | |
| *B64C 27/20* | (2006.01) | |
| *B64C 27/16* | (2006.01) | |

(52) U.S. Cl.
CPC ............ *F04D 29/545* (2013.01); *B64C 27/16* (2013.01); *B64C 27/20* (2013.01); *F04D 25/06* (2013.01); *F04D 25/08* (2013.01); *F04D 29/38* (2013.01)

(58) Field of Classification Search
CPC ...... F04D 25/06; F04D 25/0606; F04D 25/08; F04D 29/38; F04D 29/545; F04D 29/563; B64C 1/108; B64C 27/12; B64C 27/16; B64C 27/20; B64C 2027/8209; B64C 11/001
USPC .................................................. 417/355, 356
See application file for complete search history.

(56) References Cited

U.S. PATENT DOCUMENTS

| | | | |
|---|---|---|---|
| 7,906,933 B2 * | 3/2011 | Tan .......................... | H02P 27/04 318/801 |
| 2005/0082421 A1 * | 4/2005 | Perlo ...................... | A63H 27/12 244/12.2 |
| 2006/0049304 A1 * | 3/2006 | Sanders ................. | B64C 39/024 244/23 A |
| 2007/0252033 A1 * | 11/2007 | Bojiuc ................... | B64C 39/001 244/62 |
| 2012/0025032 A1 * | 2/2012 | Hopdjanian .......... | B60L 3/0046 244/53 R |

* cited by examiner

*Primary Examiner* — Philip E Stimpert

(57) ABSTRACT

The ideal design for a redundant orbitally driven electric ducted fan that can replace a family of current propeller and motor combinations in electric ducted fan designs by meeting air flow and pressure requirements while drawing less electric current to rotate and thus produce the required flow not only would reduce cost of operation over the life of the fan but opens new possibilities for electric powered vertical takeoff and landing vehicles with redundant drives improving safety of operation. The entry of flying machines using propellers and lifting fans such as hover bikes and quadcopters, manned or unmanned is driving a need to reexamine the application of force applied to rotate these fans to achieve a reduction in aircraft weight and increase flying time for a given battery charge or load of fuel.

10 Claims, 2 Drawing Sheets

REDUNDANT DRIVE ORBITTALLY DRIVEN ELECTRIC DUCTED FAN PRODUCING TORQUE WITH LOWER ELECTRIC CURRENT DRAWN

CROSS REFERENCE TO RELATED APPLICATIONS

This application claims priority from U.S. Provisional Application Ser. No. 62/755,760 filed Nov. 5, 2018.

STATEMENT REGARDING FEDERALLY SPONSORED RESEARCH OR DEVELOPMENT

This invention was not made with U.S. Government support.

BACKGROUND PRIOR ART

The present invention is directed generally to electric ducted fans (EDF) used currently in the primarily as propulsion systems for aircraft but can also replace axial flow fans employed in agricultural and HVAC applications. In particular, the present invention relates to a new class of EDFs which are obitally driven fans (ODF).

In electric ducted fans an electric motor drives a propeller inside a close tolerance duct. The duct reduces losses in thrust from the tips of the propellers, making it more efficient and also reduces noise.

To obtain redundancy driving a lifting fan for use in aircraft or HVAC applications requiring high availability, a designer must employ multiple belts or a transmission. Matching speed of two different motors requires precision, the result being there are few if any multiple motors driving one propeller. As drones and flying cars become a reality in a new age of electric flight redundancy will be a safety imperative.

Typical application of force to rotate axial flow fans is through a center axle making the use of multiple fans placed in stages and counter rotated to increase pressure across each stage very difficult and seldom used.

Typical EDFs employ high torque electric motors which employ heavy cores and layers of copper windings to generate significant electro-magnetic force to rotate the propellers. Weight is critical in vertical takeoff and landing aircraft (VTOL), the need for weight reduction in electric vertical takeoff and landing aircraft (eVTOL), is magnified because charge life on the battery must be maximized for practical applications.

Power consumption is a big cost element in all types of airflow production. Typically force is applied to rotate the fan through the hub. Current art pays a heavy price for this. Commercial helicopters only lift 8-15 pounds per each unit of horse power applied.

There is, therefore, a need for a configuration that applies electro-magnetic force through multiple or redundant sets of electro-magnet coils to the same fan at a point favorable to reducing the amount of force applied while torque remains constant, in this way the force component of the moment arm is reduced and that is what the electric power applied produces through the excitation of the electro-magnetic coil, thereby extending battery life and duration of operation on each battery charge. A configuration that can easily allow for multiple fans placed in stages to increase pressure across each stage.

SUMMARY OF THE INVENTION

The present invention is directed to electric ducted fans. In particular, the present invention is directed to obitally driven electric ducted fans having the electro-magnetic drive components mounted on the outer wall of a rotating duct applying magnetic force to rotate the integrated motor rotor duct, and fan assembly in relation to a fixed stator assembly.

It is an advantage of the presently disclosed device to provide an orbitally driven electric ducted fan with a design approach that provides redundant drive components energized by separate circuits each wired in parallel each circuit being powered from a duplicate bus thus there are separate and redundant circuits. The redundancy of drives allowing for high availability operations where the failure of one circuit could be catastrophic.

It is a further advantage of the presently disclosed device that the magnitude of the force (thrust), vector required to drive the fan from beyond the exterior wall of the duct and thusly it is less than the magnitude of the drag vector, the sum of which is applied to the blade tips connected to the duct inner wall. Torque required remains constant as only the point where force is applied has moved and the lever to which it is applied has been extended. Having no physical contact the electromagnetic force can be applied to the integrated motor rotor, duct, and fan assembly as rapidly as an electric motor can be commutated which is nearly instantaneous, to accelerate it to a desired speed of rotation.

It is a further advantage of the presently disclosed device that by employing electro-magnetic force rather than physical force to turn the rotor, duct, and fan assembly, speed of rotation is not limited by slight speed variations in multiple drive motors as with the application of mechanical connection solutions such as pulleys or gears.

The device now disclosed can reduce the weight of the fan by reducing the size of the electro-magnets turning the integrated rotor, duct, and fan assembly.

It is a further advantage of the presently disclosed device that the application of force orbitally about the outer duct wall thus the designer can employ less magnetic force and yet actually increase the torque applied for better performance.

It is a further advantage of the presently disclosed device the rotation of the duct carries rotational momentum which is harnessed as a flywheel allowing the designer to space the drive coils and permanent magnets further apart.

It is a further advantage of the presently disclosed device that it integrates the motor rotor, duct, and fan as one assembly providing structure where an apparatus can be mounted so the motive force can be advantageously applied. Mounted upon said structure is a plurality of permanent magnets spaced evenly about the duct or conversely electromagnetic drive coils as the designer selects.

It is an advantage of the device now disclosed that the polarity of the permanent magnets whether mounted on the duct extension structure or on the stator, alternates with each successive magnet in the direction of rotation. This plurality of magnets combined with the electromagnetic drive coils provides the force to rotate the entire rotor, duct, and fan assembly about the hub. Thus the entire rotating body becomes the rotor for an integrated electric motor and ducted fan assembly. The permanent magnets rotate orbitally around the duct as it rotates, just as a moon might orbit a planet.

The device now disclosed has a stator with a single electromagnet or a plurality of electromagnets or if the duct has the electromagnets, permanent magnets are employed on the stator either of which encircle the integrated duct motor rotor, fan assembly with sufficient clearance for the assemblies rotation within.

In the device now disclosed the stator for the integrated electric motor being mounted or fixed in position in a way providing close enough clearance for motor operation yet allowing the duct fan assembly to rotate freely within.

It is an advantage of the device now disclosed that a plurality of complete fan assemblies can be placed in line and counter rotated one stage to the next so as to increase pressure across each fan stage.

The device now disclosed may employ magnetic bearings of like polarity to balance duct rotation and keep it in alinement.

DETAILED DESCRIPTION OF EXEMPLARY EMBODIMENTS

Integrated Fan Rotor Assembly

Figure 1:
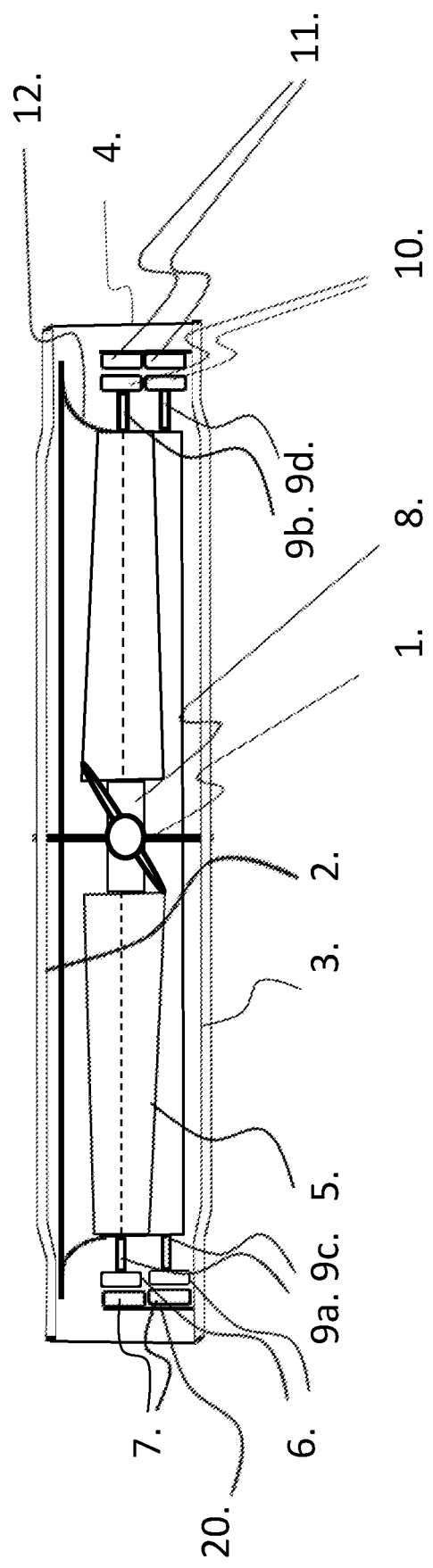
FIG. 1 is a cut away side view of a circular mounting housing embodiment employed with a fixed pitch fan or propeller.
Figure 2:
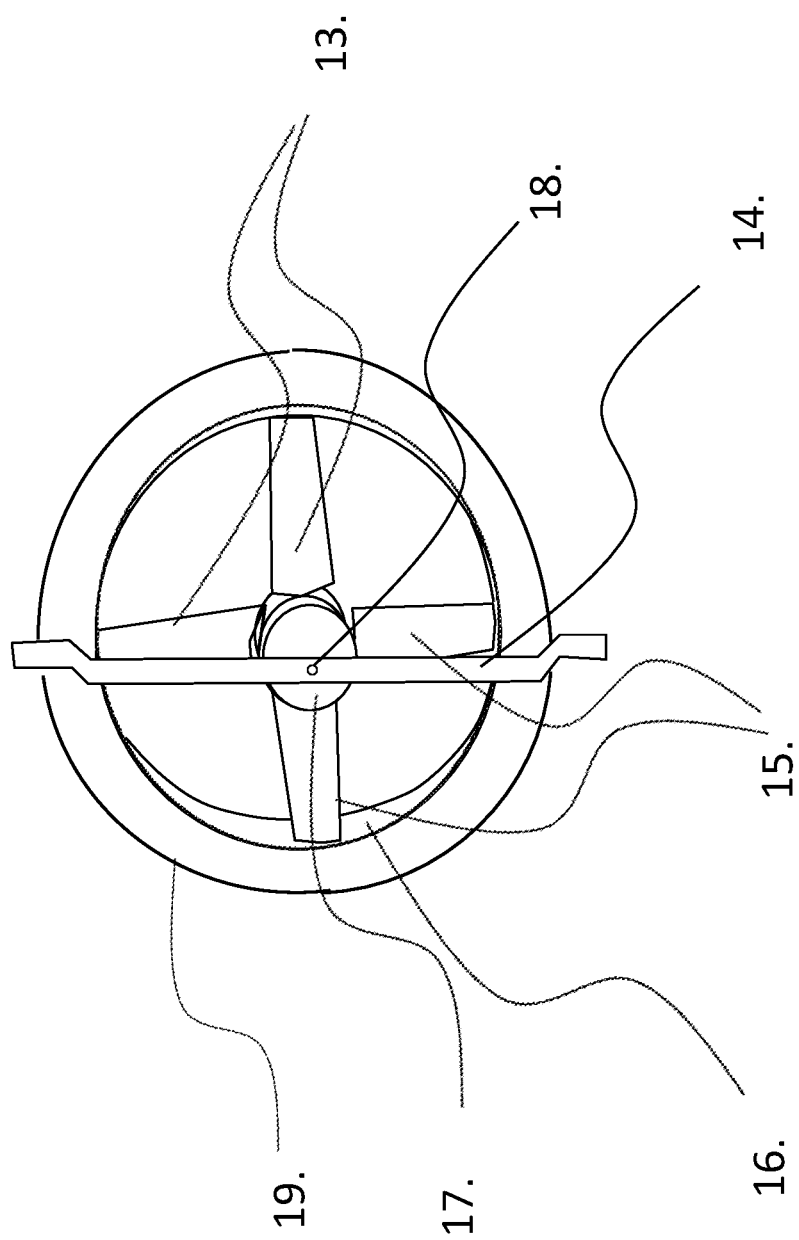
FIG. 2 is a profile view of an agricultural box fan embodiment.

Referring to FIGS. 1 and 2, through a center line drawn from the air inlet through the air outlet is a main axle 1 and 18. This non-rotating axle is retained in that position by sufficient support as determined by the designer. This support can be a front and rear 14 if the fan is mounted vertically or top and bottom bearing 2 and 3.

The main axle 1 and 18 needs to be stiff enough to resist unbalanced rotational forces applied during continuous operation. If the environment in which the fan operates is subject to foreign object damage the designer will have to balance increased structure to account for such risk against the safety issues involved, cost of manufacture, and cost of operation.

Fixed linearly on the main axle 1 and 18 and located at the center point of the stator assembly 20, is a fan blade mounting hub 8 and 17 (FIGS. 1 and 2). This hub is so named as the fan blades 5, 13, and 15 are mounted are themselves mounted on this hub. Weight is of primary concern and modern precision manufacturing techniques should be employed to obtain a light weight perfectly balanced hub.

The fan blade mounting hub 8 and 17 rides on at least one bearing or bushing as the designer decides, on each support 2, 3, and 14. The positioning of this bearing or bushing linearly on the axle is fixed. The bearing enables rotation of the hub about the axle and provides for mounting of the fan blade axles 3 on which the fan blades 4 and 22 are mounted.

The fan blades 5, 13, and 15 are rigidly fixed in pairs to the fan blade mounting hub 2 and 14, extending laterally outward perpendicular to the main axle 1 and 18. Each fan blade 5, 13, and 15 in the pair is mounted on opposing sides of the main axle 1 and 18.

These fan blades 5, 13, and 15. The aerodynamic properties are selected by the designer so as to achieve the flow and pressure production required by the application at a specified speed of rotation and angle of attack. Weight calculated to provide sufficient rotational momentum along with the duct is of primary concern and modern precision manufacturing techniques should be employed to obtain a set of fan blades which are balanced and at the correct weight.

Affixed to the ends of the fan blade tips is a rotating duct 12 and 16 that encircles the whole assembly.

The fan blade tips should be fixed to the inner wall of the rotating duct 12 and 16. The rotating duct 12 and 16 can be constructed of metal, plastic, or composite materials as selected by the designer. However balance and precisely calculated weight is of primary concern and modern precision manufacturing technics should be employed to obtain a properly weighted and balanced duct that also provides structural support to resist deformation under high loads.

Construction of the integrated fan rotor assembly requires the designer to select appropriately sized permanent magnets or electromagnets as the designer selects and placed at position 6 and 10. Regardless of magnet type, these should be crafted with provision to be evenly spaced around the duct 12 and 16 mounted on a structure that places them out from the outer wall of the rotating duct so they rotate orbitally drivingly integrated with the rotating duct.

Weight is of primary concern and modern precision manufacturing technics should be employed to obtain light weight perfectly balanced sets of permanent magnets 6 as selected and must be evenly spaced about the duct outer wall.

The whole assembly described is the fan electric motor rotor assembly.

Mounting Housing

The designer can employ mounting apparatus 4 and 19 as a means for mounting fan components to provide sufficient structure that takes a box, or cylindrical form factor. This mounting apparatus 4 and 19 has provision for the stator 7 and main axle 1 and 18. This mounting housing provides a structure on which all necessary componentry is mounted. It likewise provides for mounting points on which the entire fan can be mounted upon in its operational environment.

The mounting apparatus 4 and 19 can be open with mounting supports for a lifting embodiment attached to an aircraft like a quadcopter such as FIG. 1 or a box fan or a cylinder as in FIG. 2. The sidewalls can be formed with flanges that add stiffness, strength and logical fastening points.

The mounting apparatus in FIG. 2 could have a structural rear flange oriented outward not interrupting flow, which provides structural support and provides potential for mounting points for internal componentry, mounting points of the unit in its operational environment, and or connection to a subsequent units when multiple units are mounted inline as system requirements dictate.

The mounting apparatus 4 and 19 open or box style including faceplate, sidewalls, main axle supports front and rear, and rear flange can be easily fabricated from sheet stock or composite material by one accomplished and knowledgeable in the field using common tooling and materials.

The sidewalls may be designed with flanges to attach to the faceplate or the designer might decide to employ welding if the material selected is metallic in nature. If plastic or composite materials are selected the entire housing could be molded as one unit or joined chemically if molded as two parts as the designer deems the application warrants.

The stator assembly 20; The stator needs to be circular in shape so as to encircle the fan blade rotor assembly with a close enough tolerance to function per design yet allowing rotation of the assembly within.

The designer can select the use of electromagnets or alternatively permanent magnets for the stator if one type of magnet is selected for the stator the rotor would have to have the other. The stator magnets 7 and 11 are integrated into the stator assembly. The stator mounted magnets 7 and 11 are mounted by means of hardware evenly spaced around the stator which encircles the duct. The final design must allow the rotation of the fan blade rotor assembly while obtaining the performance specified to meet system requirements.

The duct mounted magnets 6 and 10, would be mounted on a structure 9a. and 9b., placing them so they rotate orbitally around the duct yet inside the stator Means of Reversing Polarity The wiring harness for either the rotor magnets 6 and 10 and or stator magnets 7 and 11 whichever has electromagnets, should have a means of commutation or timing if polarity is reversed by alternating magnet polarity.

We claim:

1. An electric ducted fan comprising:
   an airflow inlet;
   an airflow outlet;
   a non-rotating main axle extending along an axis defined between the airflow inlet and the airflow outlet;
   a stator mounting apparatus;
   a stator fixed on the stator mounting apparatus, the stator comprising
      a plurality of redundant sets of electromagnetic coils; and
      a plurality of redundant circuits which provide electrical power to the plurality of redundant sets of electromagnetic coils;
   a plurality of power buses from which the redundant circuits draw power, wherein each power bus is wired in parallel to all redundant circuits; and
   a rotor mounted to rotate freely within the stator, the rotor comprising
      a blade mounting hub disposed coaxially along the main axle,
      a plurality of fan blades forming an axial flow fan and being supported by the blade mounting hub,
      a rotating duct, wherein an end tip of each of the plurality of fan blades is directly connected to the duct such that rotation of the fan blades results in the duct acting as a flywheel, and
      a plurality of permanent magnets mounted on a structure around an outer wall of the duct, the plurality of permanent magnets being mounted radially within the stator;
   wherein the electric ducted fan is configured to apply force through each of the redundant sets of electromagnet coils to the plurality of permanent magnets to rotate the rotor.

2. An electric ducted fan comprising:
   an airflow inlet;
   an airflow outlet;
   a non-rotating main axle extending along an axis defined between the airflow inlet and the airflow outlet;
   a stator mounting apparatus;
   a stator fixed on the stator mounting apparatus, the stator comprising
      a plurality of permanent magnets; and
   a rotor mounted to rotate freely within the stator, the rotor comprising
      a blade mounting hub disposed coaxially along the main axle,
      a plurality of fan blades forming an axial flow fan and being supported by the blade mounting hub,
      a rotating duct, wherein an end tip of each of the plurality of fan blades is directly connected to the duct such that rotation of the fan blades results in the duct acting as a flywheel, and
      a plurality of redundant sets of electromagnetic coils mounted on a structure around an outer wall of the duct;
      a plurality of redundant circuits which provide electrical power to the plurality of redundant sets of electromagnetic coils, and
      a plurality of power buses from which the redundant circuits draw power, wherein each power bus is wired in parallel to all redundant circuits;
   wherein the plurality of permanent magnets are mounted radially outside the electromagnet coils,
   further wherein the electric ducted fan is configured to apply force through each of the redundant sets of electromagnet coils to the plurality of permanent magnets to rotate the rotor.

3. The electric ducted fan of claim 1, wherein the fan blades extend outwardly from and perpendicularly to the main axle.

4. The electric ducted fan of claim 1, wherein the rotating duct encircles the rotor.

5. The electric ducted fan of claim 1, wherein a plurality of magnetic bearings transfer thrust loading from the rotor to the stator mounting apparatus.

6. The electric ducted fan of claim 1, wherein the electromagnetic coils and the permanent magnets cooperate to form an axial flux permanent magnet motor.

7. The electric ducted fan of claim 2, wherein the fan blades extend outwardly from and perpendicularly to the main axle.

8. The electric ducted fan of claim 2, wherein the rotating duct encircles the rotor.

9. The electric ducted fan of claim 2, wherein a plurality of magnetic bearings transfer thrust loading from the rotor to the stator mounting apparatus.

10. The electric ducted fan of claim 2, wherein the electromagnetic coils and the permanent magnets cooperate to form an axial flux permanent magnet motor.

* * * * *